Patented May 22, 1923.

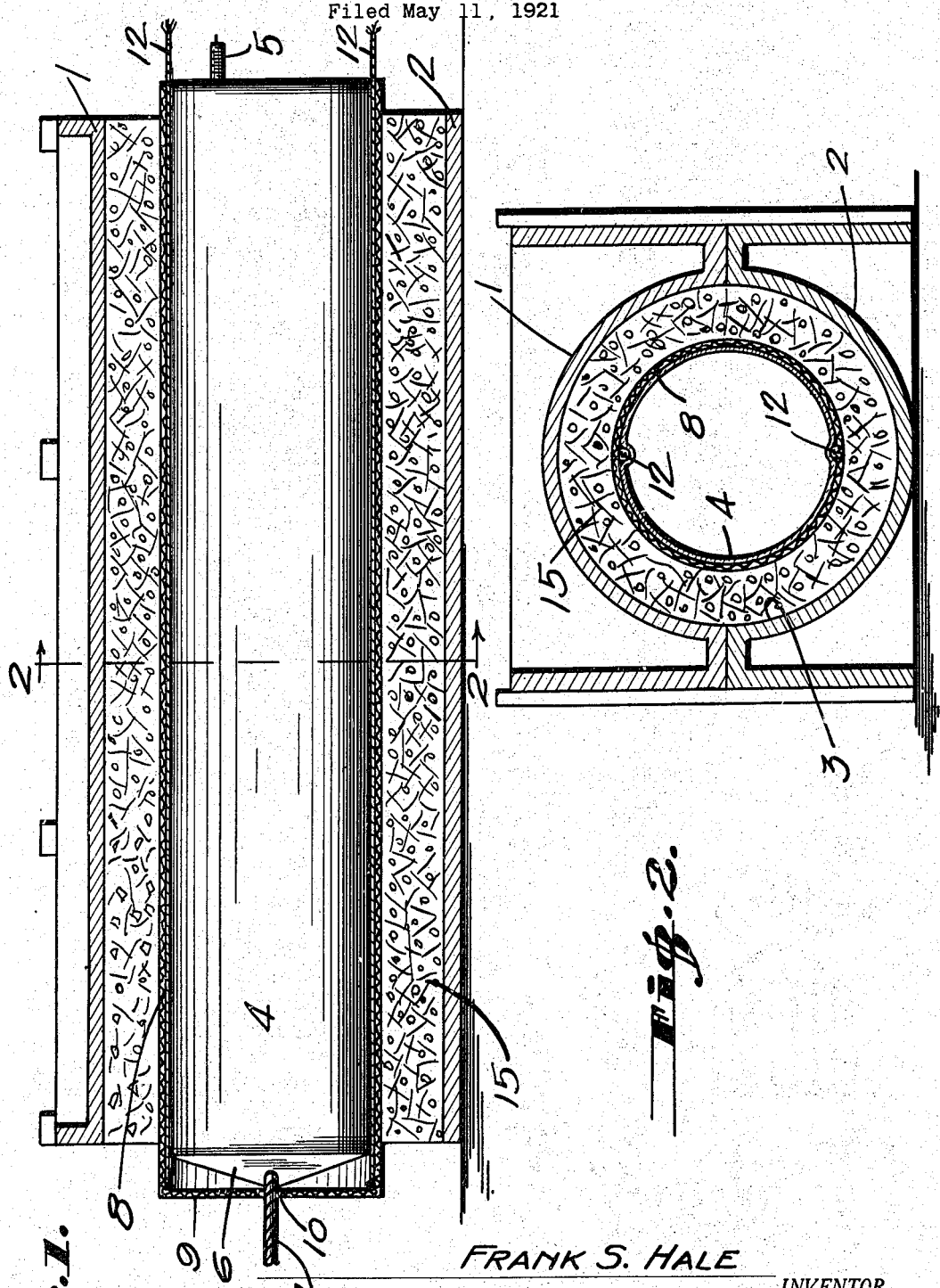

1,456,058

UNITED STATES PATENT OFFICE.

FRANK S. HALE, OF LONG BEACH, CALIFORNIA.

CORE FOR MAKING PIPES AND THE LIKE.

Application filed May 11, 1921. Serial No. 468,481.

*To all whom it may concern:*

Be it known that I, FRANK S. HALE, a citizen of the United States, residing at Long Beach, in the county of Los Angeles and State of California, have invented new and useful Improvements in Cores for Making Pipes and the like, of which the following is a specification.

This invention relates to the manufacture of plastic pipes, or other hollow structures where a core is employed.

The present invention contemplates the provision of a core of flexible material and adapted to be readily inflated or deflated in order to extend the core into position for use, or contract the same for removal from a mold.

The invention will be readily understood from the following description of the accompanying drawings, in which:

Figure 1 is a longitudinal section through an apparatus constructed in accordance with the invention.

Fig. 2 is a transverse section on the line 2—2 of Fig. 1.

In the present embodiment of the invention I have shown a pipe molding apparatus including usual mold sections 1 and 2 co-operating to form the cylindrical mold 3. This mold structure is open at its respective ends so that the core for the mold may be readily inserted and removed.

The core includes a tube 4 of the desired conformation and formed of elastic material, such as rubber, so as to provide an air tight filler. The tube is provided at one end with an air valve 5, and the opposite end of the tube preferably has a web 6 to which a suitable rope, or the like, as shown at 7, may be connected.

A casing of flexible material, such as canvas, is received over tube 4 and includes a tubular wall 8 and an end wall 9 having an opening 10 through which rope 7 projects. The opposite end of the canvas casing is open, and ropes 12 extend within the canvas casing through the open end of the same and are connected to the wall 9 of said casing.

In practice the core structure is drawn into the mold by pulling upon rope 7, and when the core is positioned, the tube 4 is inflated so as to expand the canvas casing and thereby form the core for the mold. Concrete, or other plastic material, is then poured so as to form a tubular pipe, or the like, such as shown at 15. In order to remove the core, the air is allowed to escape through valve 5, and by pulling upon ropes 12, the core structure may then be withdrawn from the molded pipe and thereby permit of removal of the finished pipe structure.

It will thus be seen that I have provided an extremely simple but practical means for molding hollow structures formed of plastic material, since the improved core provides for readily expanding the same into a position for use and for as readily contracting the core when it is desired to remove the same.

Various changes may be made without departing from the spirit of the invention as claimed.

What is claimed is:

1. A core for a mold comprising a flexible casing of fabric material, an elastic air receptacle within the casing adapted to inflate the same to extend said core, and ropes extending within said casing through an open end thereof and connected to the opposite end of said casing.

2. A core for a mold comprising a flexible casing of fabric material, an elastic air receptacle within the casing adapted to inflate the same to extend said core, and a rope projecting from the end of said air receptacle through an end of said casing.

3. A core for a mold comprising a flexible casing of fabric material, an elastic air receptacle within the casing adapted to inflate the same to extend said core, ropes extending within said casing through an open end thereof and connected to an end of said casing, and a rope projecting from the end of said air receptacle through an end of said casing.

In testimony whereof I have signed my name to this specification.

FRANK S. HALE.